US012318902B1

(12) United States Patent
Mellin et al.

(10) Patent No.: US 12,318,902 B1
(45) Date of Patent: Jun. 3, 2025

(54) STAPLE TOOL APPARATUS

(71) Applicants: Troy C. Mellin, Bradenton, FL (US); Kevin W. Black, Myakka City, FL (US)

(72) Inventors: Troy C. Mellin, Bradenton, FL (US); Kevin W. Black, Myakka City, FL (US)

( * ) Notice: Subject to any disclaimer, the term of this patent is extended or adjusted under 35 U.S.C. 154(b) by 0 days.

(21) Appl. No.: 18/589,996

(22) Filed: Feb. 28, 2024

(51) Int. Cl.
*B25C 5/02* (2006.01)

(52) U.S. Cl.
CPC .................................. *B25C 5/0285* (2013.01)

(58) Field of Classification Search
CPC ......... B25C 5/0285; B25C 3/006; B25C 1/02; B25C 3/008; B25C 5/11; B25C 7/00; B25C 9/00; B25D 1/00; B25D 1/06; B25D 1/14; B25D 11/06; B25D 17/02; B25D 2250/005; B25D 2250/025; B25D 2250/051; B25D 2250/095; B25D 2250/111; B25D 2250/121; B25D 2250/141; B25D 2250/361
See application file for complete search history.

(56) References Cited

U.S. PATENT DOCUMENTS

| | | | | |
|---|---|---|---|---|
| 5,163,597 | A * | 11/1992 | Napoli, Jr. | B25C 3/006 227/140 |
| 5,921,456 | A * | 7/1999 | Kirsch | A61B 17/92 173/124 |
| 6,553,640 | B1 * | 4/2003 | Estes | B25C 1/02 29/525 |
| 7,407,073 | B2 * | 8/2008 | Rafaeli | B25C 1/02 227/18 |
| 2005/0126345 | A1 * | 6/2005 | Berthiaume | B25C 3/006 81/44 |
| 2019/0001475 | A1 * | 1/2019 | Vitek | E04H 17/268 |
| 2021/0094162 | A1 * | 4/2021 | Harper | B25D 1/06 |

* cited by examiner

*Primary Examiner* — Eronica Martin
(74) *Attorney, Agent, or Firm* — Jason A. Smith; Shumaker, Loop & Kendrick, LLP

(57) ABSTRACT

A staple driving tool that is dumbbell shaped having a first end, a second end, and a handle intermediate the first and second ends. The first end includes a staple receiving slot. The slot includes a concealed or recessed magnet to secure the staple within the slot for driving the staple into a support (i.e., a fence post). The second end has a flat surface for striking with a hammer to drive the staple into the post. The staple driving tool is generally symmetrical along a first axis, with the first and second end having a larger circumference than the handle. Alternatively, the staple receiving slot may be a cruciform slot. The cruciform slot has a first slot having a first length and a second slot having a second length, where the first slot is perpendicular to the second slot, and the first length is greater than the second length.

12 Claims, 2 Drawing Sheets

STAPLE TOOL APPARATUS

TECHNICAL FIELD

The present disclosure generally relates to an apparatus for driving a staple, and more particularly, to a device for easing the driving of fencing staples and other similar devices into a wooden post or other mounting support.

BACKGROUND

Securing barbed wire or other fencing to a fence post typically requires driving a staple into the post to secure the wire. The staple or nail may be U-shaped to attach the wire to the fence posts or other supporting structure. However, as with driving any nail or staple, injuries may occur if the user hits their hand with a hammer while holding the staple in place in order to secure it to the post.

Thus, a need exists for a device that has the ability to hold various sizes and types of fencing staples while also minimizing the risk of the user striking their hand instead of the staple.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In example embodiments, a staple installation apparatus is disclosed having a first rounded end, a second rounded end, and a rounded handle intermediate the first end and the second end. The first rounded end includes an elongated slot for receiving a staple. The second rounded end has a flat rear surface configured for striking with a hammer. In particular, the staple installation apparatus is generally dumbbell shaped, where the circumference of the handle is less than the circumference of both the first end and the second end.

According to example embodiments, a staple driving tool has a first end, a second end, and a handle. The handle is intermediate the first end and the second end. The first end includes a staple receiving slot and the second end includes a flat striking surface. In example embodiments, the first end, the second end, and the handle are integrally formed in a dumbbell shape.

Various example embodiments disclosed include a method of using a staple driving tool that includes providing a staple driving tool, where the staple driving tool has a first end having a staple receiving slot, a second end having a flat striking surface, and a handle intermediate the first end and the second end. The method further includes instructing a user to insert a staple into the staple receiving slot, to hold the staple driving tool by the handle, and to hammer the second end to drive the staple into a support such as a fence post.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
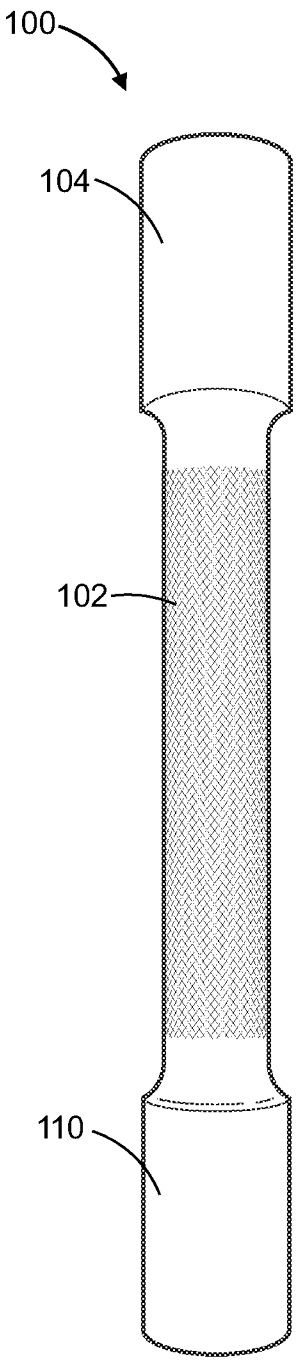
FIG. 1 is a side view of a staple tool apparatus, in accordance with an embodiment of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions. As used herein, the term "about," when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are within the scope of these descriptions.

Referring to FIGS. 1-6, a staple tool apparatus 100, such as an apparatus for driving a staple 200 into a fence post, is disclosed. In various embodiments, the staple tool apparatus 100 is particularly beneficial in assisting a user with driving a staple into a post or other support as it allows the user safely drive the staple into the support without fear of missing the staple with a hammer and hitting their hand rather than the staple. The staple tool apparatus 100 also allows the user to easily align and position the staple so that it is installed correctly into the post.

Figure 5:
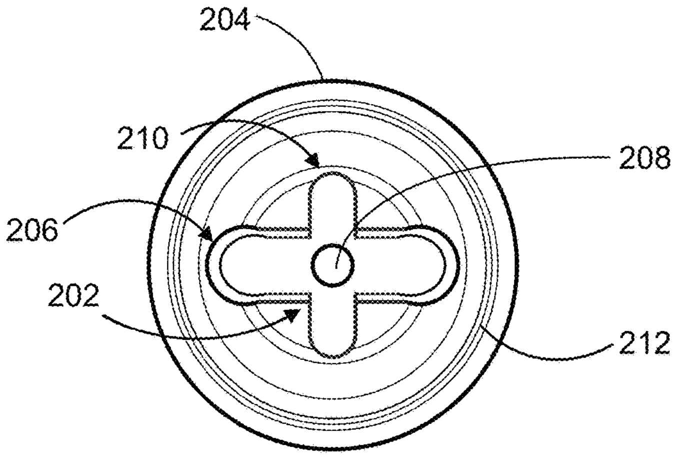
FIG. 5 is front planar view of an alternate embodiment of a first end of the staple tool apparatus of FIG. 1.

In example embodiments, the tool 100 is generally dumbbell-shaped. For example, the staple tool 100 generally includes a first end or staple-holding end 104 and a second end or striking/driving end 110. Intermediate the first end 104 and the second end 110 is a handle 102 that allows a user to hold the tool while using it. In various embodiments, the tool 100 may be formed of stainless steel. In alternate embodiments, any suitable and rigid or sturdy material may be used to form the tool 100. In particular embodiments, the first end 104, the handle 102, and the second end 110 are integrally formed or, in the alternative, the parts may be separately formed and attached thereto. For example, the first end 104 may be releasably coupled to the handle for interchanging the first end 104 with the alternate embodiment first end 204, as shown in FIG. 5. Similarly, the second end, or striking 110 may be releasable coupled to the handle for replacing once it has worn out from being hammered during use. In example embodiments, the first end 104 and/or the second end 110 may include outer threads that align with inner threads on the handle 102 in order to releasably screw the parts together.

In particular embodiments, the handle 102 is knurled or formed with any other suitable texture that provides the user with a more stable grip on the tool 100. In alternate embodiments, the handle 102 may be smooth and user may wear gripping gloves or use another device to assist in holding the tool 100 in place while in use. In some embodiments, the handle 102 may include a wrap or other device that aids in gripping the tool 100. For example, a removable wrap formed of padded neoprene or similar material that includes an inner surface formed of a non-slip grip such as silicone to provide a comfortable, but secure grip on the tool 100. In various embodiments, the wrap may be secured to the tool using any suitable fastener (e.g., snaps, clips, buttons, hook-and-loop materials, zippers and/or the like may be utilized).

In example embodiments, the handle 102 is generally rod-like in shape and may be any suitable length. For example, the handle 102 may be between about 3" and 12", more preferably about 4" to about 10", for example about 5" to about 8". In particular embodiments, the handle 102 is sized and shaped for easily gripping by a user for using the tool to drive a staple into a fence post. In some embodiments, the handle 102 may have one or more grooves that align with a typical user's hand to maintain the handle in the correct orientation for driving a staple into a support.

According to example embodiments, the first end of the tool 100 includes a staple-holding end 104. In example embodiments, the staple holding end or first end 104 has a generally round outer circumference. In some embodiments, the first end 104 may be tapered such that the circumference increases towards the handle or, in the alternative, increases towards the end for holding the staple. In example embodiments where the first end is tapered towards the handle, the larger circumference proximate the handle would assist in preventing the user's hand from sliding forward while using the tool.

Figure 2:
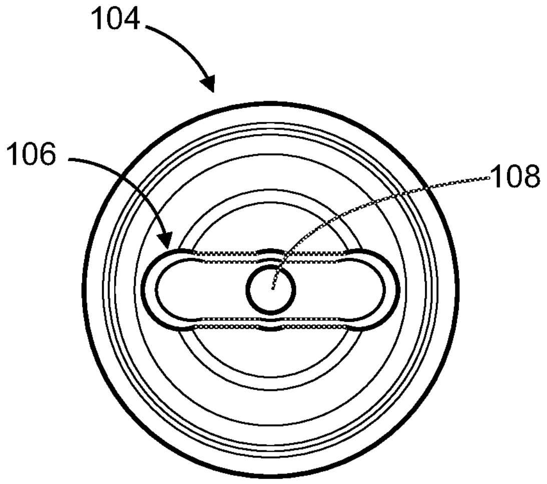
FIG. 2 is a front planar view of a first end of the staple tool apparatus of FIG. 1.

As shown in FIG. 2, in particular embodiments, the first end 104 has a slot 106 for holding a staple that is to be installed. In example embodiments, the slot 106 is elongated with rounded ends. In some embodiments, the rear of the slot 106 includes a magnet 108 for releasably securing the staple in the slot so that it does not fall out prior to installation. Although shown and described as at the rear of the slot 106, the magnet 108 may be positioned anywhere within the first end 104 and concealed or recessed within the first end to secure the staple 200 to the tool 100. In some embodiments, the entire first end 104 may be magnetized to retain the staple within the slot 106.

Figure 4:
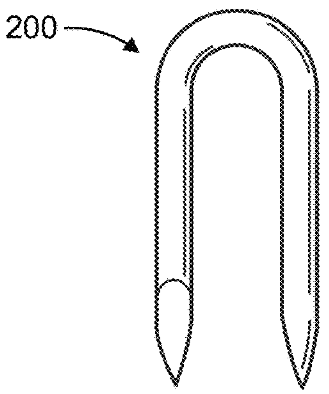
FIG. 4 is a front view of an exemplary staple that may be used with the staple tool apparatus of FIG. 1.

In particular embodiments, the slot 106 is sized and shaped to be used with any typical fence staple 200, such as the one shown in FIG. 4. For example, the staple 200 may be generally U-shaped and have a smooth-shank with dual sharp points or ends for easy insertion into wood or other substance. In example embodiments, the fence staple ends 200 have either a left or right slash cut, such that when installing the staple, regardless of the way it is turned, there is a right-hand slash cut. The slash cut provides the benefit of allowing the legs of the staple to be forced outward when it is installed on a wood post to provide a better holding strength. In example embodiments, the staple 200 may be formed from stainless steel or any other suitably rigid material. In general, the staple 200 is a type of fastener that is durable and corrosion and/or rust resistant. In example embodiments, the staple may be used for a variety of applications, including, but not limited to, work on cooling towers, crating, and fences. In various embodiments, the staple may be a barbed staple (not shown or numbered), which assists with retaining the staple in the substrate such as wood after it is installed.

Figure 3:
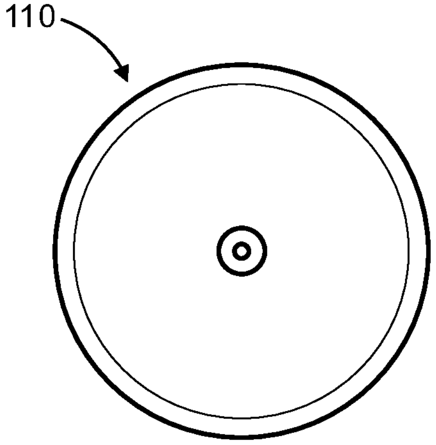
FIG. 3 is a front planar view of a second end of the staple tool apparatus of FIG. 1.

As shown in FIG. 3, the second end or striking/driving end 110 has a generally flat surface that is configured to align with the head of a typical hammer or mallet. When in use, a user will hammer the striking end 110 of the tool to drive the staple into a fence post. Referring again to FIG. 1, as with the first end 104, the second end 110 has a generally larger circumference than the handle 102. In some embodiments, the second end 110 may be tapered such that the circumference increases towards the handle 102 or, in the alternative, increases towards the flat end, providing a larger target for the user so that they do not injure themselves while using the staple driving tool 100.

Referring to FIG. 5, a second embodiment of a tool 100 driving end 204 is illustrated. For purposes of clarity and ease of understanding, only the differences between this embodiment and the embodiment illustrated in FIG. 2 will be discussed. For example, the driving end 204 shown in FIG. 5 includes a cruciform slot 202 that is configured for retaining or holding multiple staple sizes one at a time. The cruciform slot 202 is circumferentially surrounded by a circumferential annular wall 212. For example, the second end 204 may include a first elongated slot 206 and a second elongated slot 210, where the second slot is perpendicular to the first slot. In particular embodiments, the second slot 210 may be shorter than the first slot 206 such that staples of various sizes can be installed using the same first end 204. Thus, rather than changing out the driving end 104, the second embodiment driving end 204 may be used when a project requires staples of various sizes. In this embodiment, one or more magnets 208 may be concealed or recessed within the driving end 204 to secure the staple(s) to the tool.

Figure 6:
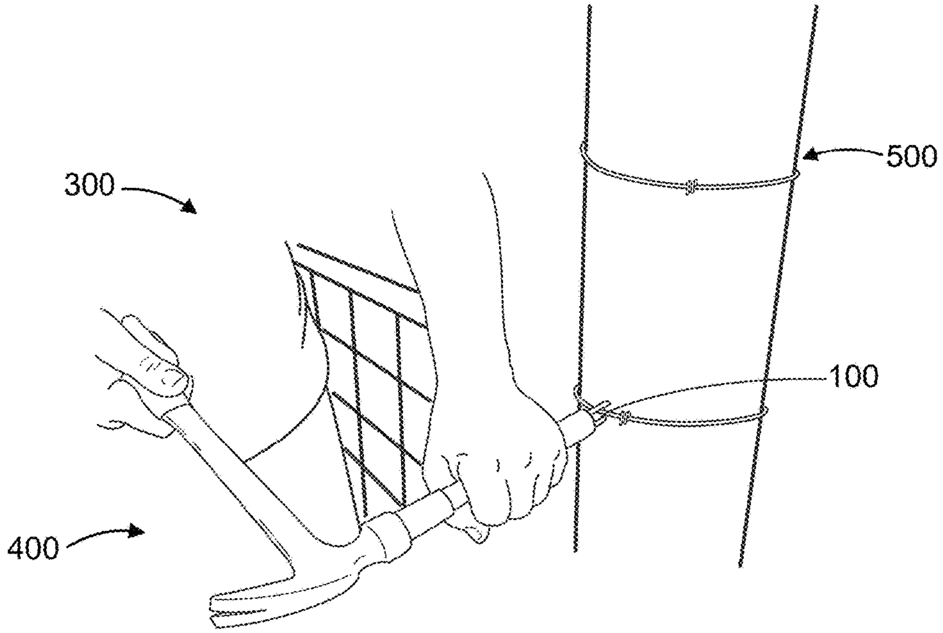
FIG. 6 is a perspective view of the staple tool apparatus of FIG. 1 in use.

FIG. 6 depicts a method of using a tool 100, according to the present embodiment of the concept. For example, a user 300 may hold the tool 100 by the handle 102, insert a staple 200 into the driving end 104, 204 of the tool, and then use a hammer 400 to strike the tool in order to drive the staple into a post 500 such as a fence post. In preferred embodiments, the staple is not to be driven all the way into the post, allowing the staple to expand and contract with temperature changes and to flex with any force that may be applied to the fence such as livestock pressure. In particular embodiments, the staple should be turned 30-45° left or right (depending on the slash cut of the fence staple being installed), allowing the staple to open as it goes into the post. It is also preferred that the staples be installed in a staggered fashion so that they are not in a straight line on the post, which could cause cracking of the post.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A staple installation apparatus, the staple installation apparatus comprising:

a first rounded end comprising a circumferential annular wall and a cruciform slot circumferentially surrounded by the circumferential annular wall, the cruciform slot comprising an elongated first slot and an elongated second slot perpendicular to and shorter than the elongated first slot, the cruciform slot configured for receiving one staple at a time in either the elongated first slot or the elongated second slot and driving the one staple;

a second rounded end having a flat surface configured for striking with a hammer to thereby drive the one staple via the first rounded end; and a rounded handle intermediate the first rounded end and the second rounded end, wherein a circumference of the rounded handle is less than a circumference of the first rounded end and a circumference of the second rounded end, wherein the staple installation apparatus is dumbbell shaped, and wherein the first rounded end, the second rounded end, and the rounded handle are integrally formed together and thereby move together in uniform motion without relative movement therebetween.

2. The staple installation apparatus of claim 1, wherein the cruciform slot comprises a recessed magnet for retaining a staple within the slot.

3. The staple installation apparatus of claim 1, wherein the staple tool apparatus is formed from stainless steel.

4. The staple installation apparatus of claim 1, wherein the first rounded end and the second rounded end are tapered with respect to the handle, and wherein a tapered end of the first rounded end, a tapered end of the second rounded end, and the circumference of the first rounded end and the second rounded end prevent a user's hand from slipping off the handle.

5. A staple driving tool, the staple driving tool comprising:

a dumbbell-shaped body having:

a first end comprising an annular wall and a cruciform slot circumferentially surrounded by the annular wall, the cruciform slot comprising a first slot and a second slot perpendicular to and shorter than the first slot, the cruciform slot configured for receiving one staple at a time in either the first slot or the second slot and driving the one staple;

a second end having a flat striking surface for striking to thereby drive the one staple via the first end; and a handle intermediate the first end and the second end, wherein the first end, the second end, and the handle are a dumbbell shape, and wherein a circumference of the handle is less than a circumference of the first end and a circumference of the second end, and wherein the first end, the second end, and the handle are integral together and thereby move together in uniform motion without relative movement therebetween.

6. The staple driving tool of claim 5, further comprising a recessed magnet recessed within the cruciform slot at an intersection of the first slot and second slot for retaining a staple within either the first slot or the second slot.

7. The staple driving tool of claim 5, wherein the handle comprises one or more grooves for aligning with a user's hand, and wherein the one or more grooves align a user's hand to create between approximately a 30° angle and a 45° angle with respect to the staple receiving slot for hammering in a staple to a post.

8. The staple driving tool of claim 5, wherein the handle comprises a removable wrap.

9. The staple driving tool of claim 8, wherein the removable wrap comprises padded outer surface and a non-slip inner surface.

10. A method of driving a staple into a support using a staple driving tool, the method comprising:

inserting a staple into one of a first slot and a second slot in a first end of the staple driving tool, the first slot and the second slot together defining a cruciform slot surrounded by a circumferential annular wall of the first end, the second slot perpendicular to and shorter than the first slot;

holding the staple driving tool by a handle of the staple driving tool connected to the first end; and striking a second end of the staple driving tool connected to the handle opposite the first end, while holding the staple driving tool by the handle, to drive the staple into a support.

11. The method of claim 10, wherein the support is a fence post.

12. The method of claim 10, wherein the staple is a U-shaped fence staple.

* * * * *